United States Patent
Hamelin et al.

(12) Patent No.: US 6,227,595 B1
(45) Date of Patent: May 8, 2001

(54) SEAT WITH ADJUSTABLE INTERVAL BETWEEN FEET

(75) Inventors: Bruno Hamelin, Combes-la-Ville; Dominique Cottin, Chilleurs-aux-Bois; Francois Senseby, Chatenay Malabry; Ludovic Chaillou, Massy, all of (FR)

(73) Assignee: Bertgrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/210,562

(22) Filed: Dec. 11, 1998

(30) Foreign Application Priority Data

Dec. 12, 1997 (FR) .................................................. 97 15763

(51) Int. Cl.[7] ....................................................... B60N 2/04
(52) U.S. Cl. ..................................... 296/65.03; 296/65.01
(58) Field of Search ................................... 296/63, 65.01, 296/65.03

(56) References Cited

U.S. PATENT DOCUMENTS

| 4,229,040 | 10/1980 | Howell et al. . |
| 4,925,229 | 5/1990 | Daimler-Benz . |
| 5,709,364 | 1/1998 | Araki et al. . |
| 6,012,755 | * 1/2000 | Hecht et al. ...................... 296/65.03 |

FOREIGN PATENT DOCUMENTS

| 296 10 461 U | 8/1996 | (DE) . |
| 0 722 855 | 7/1996 | (EP) . |
| 97 36 766 | 10/1997 | (WO) . |

OTHER PUBLICATIONS

French Preliminary Search Report dated Aug. 3, 1998; French Appl. No. FR 9715763.

* cited by examiner

*Primary Examiner*—D. Glenn Dayoan
*Assistant Examiner*—Jason Morrow
(74) *Attorney, Agent, or Firm*—Marshall, O'Toole Gerstein, Murray & Borun

(57) ABSTRACT

The invention relates to a seat for an automobile vehicle including a seat cushion which supports a seat back and which is intended to be fixed on the vehicle floor by means of feet, the seat cushion comprising a seat cushion structure which includes at least two lateral flanges intended to support the seat back and at least two tubes transversely connecting the two flanges, at least two feet being added on each of the tubes. Each foot is spaced from the corresponding flange by a strut.

9 Claims, 4 Drawing Sheets

SEAT WITH ADJUSTABLE INTERVAL BETWEEN FEET

FIELD OF THE INVENTION

The present invention relates to a seat for an automobile vehicle including a seat cushion which supports a seat back and which is intended to be fixed on the vehicle floor by means of feet, the seat cushion comprising a seat cushion structure which includes at least two lateral flanges intended to support the seat back and at least two tubes transversely connecting the two lateral flanges, at least two feet being added on each of the tubes.

The present invention relates in particular to seats intended to be installed aboard vehicles of the "monospace" type.

BACKGROUND OF THE INVENTION

The front and rear fixing feet of the seats currently encountered are fixed directly on the two lateral flanges of the seat cushion.

These seats are intended to be positioned on the floors of the vehicles thanks to seat feet reception means. These reception means are spaced from each other by a gap which differs from one vehicle model to another. The seat cushion flanges must therefore be adapted to each type of vehicle in order that the feet which they support have a corresponding interval between them, which necessitates specific tooling for each type of seat cushion flange.

Consequently, it is not possible to use the same manufacturing tools to make the lateral flanges of seats intended to be mounted in several types of vehicles, the spacings of the fixing means of which are different, from which a relatively high manufacturing cost results.

The present invention has the object of supplying a seat for an automobile vehicle the structure of which does not necessitate using different manufacturing tools as a function of the interval between the fixing feet to be obtained.

SUMMARY OF THE INVENTION

For this purpose, according to the invention, an automobile vehicle seat of the aforementioned type, is essentially characterized in that each foot is spaced from the corresponding flange by a strut.

Consequently, the interval between the seat feet is easily modified by installing the seat feet over the length of the transverse tubes.

The seat according to the invention may possibly comprise in addition one or more of the following characteristics:

- the vehicle floor comprises reception means for the feet which are spaced by a pre-specified value, the length of each strut being adapted to obtain an interval, between two feet carried by the same tube, of length approximately equal to aforesaid pre-specified value;
- the two flanges each include a front part and a rear part, the two front parts and the two rear parts being respectively connected by the transverse tubes;
- the tubes and the feet are made of metallic parts, the feet being fixed on the tubes by welding;
- the struts are mounted to rotate in the two lateral flanges;
- the transverse tubes each include two free ends which are crimped in the struts, so that the transverse tubes are fixed in aforesaid struts;
- the seat is removable; and
- the tubes are rectilinear at least near the lateral flanges.

The present invention has the additional object of a seat manufacturing process defined above, this process comprising stages consisting in:

- slipping two feet onto each of the two tubes
- adjusting the struts of the feet on each tube and welding the feet onto these tubes;
- mounting the struts on the tubes and abutting the struts against the feet;
- positioning the struts in the flanges; and
- crimping open the ends of the tubes over the struts.

BRIEF DESCRIPTION OF THE DRAWINGS

Two embodiment examples of the invention will now be described with regard to the appended drawings, in which.

DETAILED DESCRIPTION OF THE PREFERRED EMBODIMENTS

Figure 1:
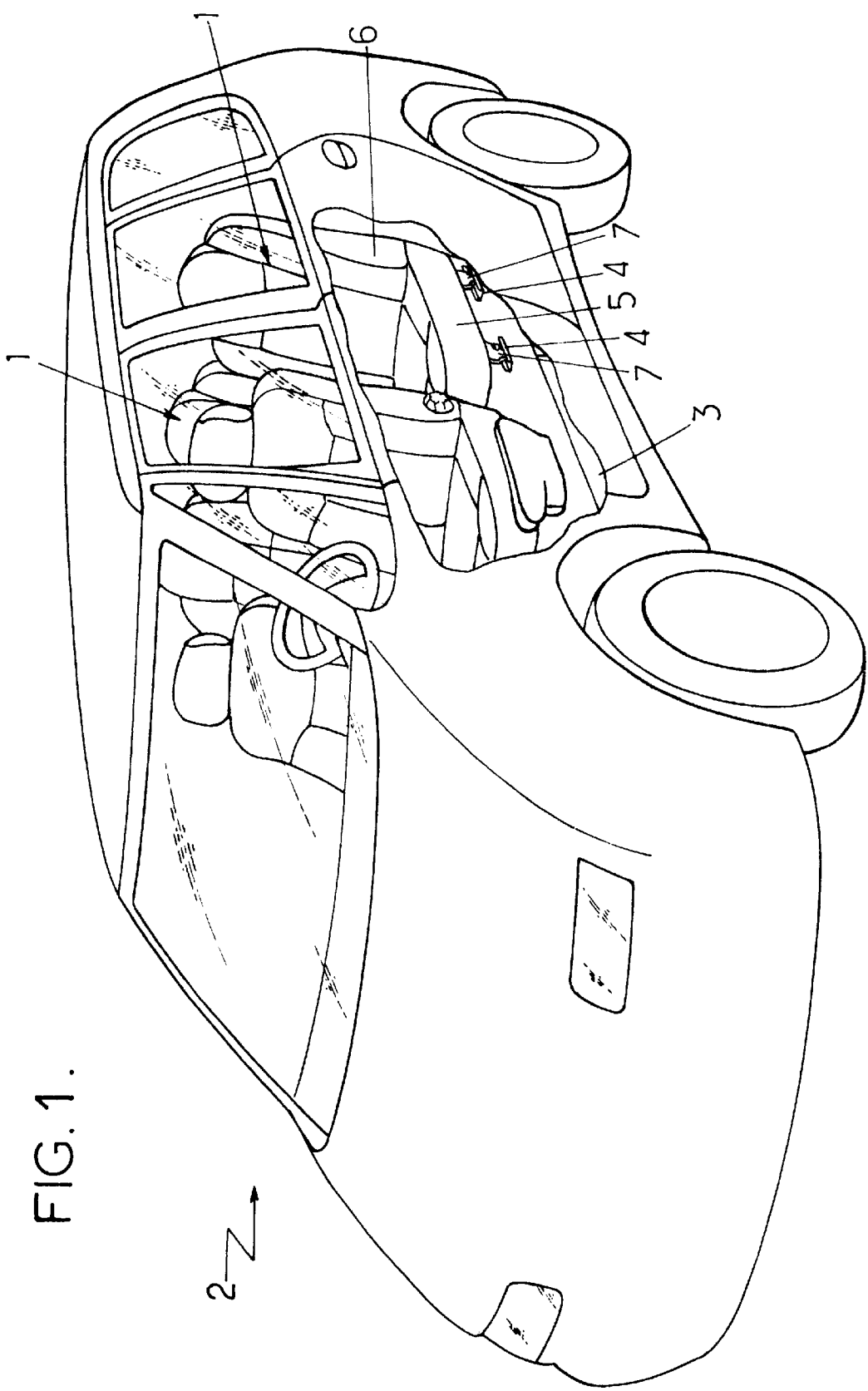
FIG. 1 is a perspective view of an automobile vehicle onboard which is installed one or more seats according to the present invention.

The seat 1 according to the present invention is intended to be installed as the rear seat onboard an automobile vehicle 2 such as that shown in FIG. 1.

The automobile vehicle, in particular of the "monospace" type, includes, itself in a known way, a floor 3 in which are distributed reception or fixing means 4 of the seat 1. These fixing means are preferably equally spaced from each other in the longitudinal direction of the vehicle to enable the positioning of the seat longitudinally in desired locations, for example in order to better manage the available space inside the vehicle 2.

The seat 1 consists of a seat cushion 5 which supports a seat back 6 and which is fixed on the floor 3 of the vehicle 2 by means of feet 7 engaging the aforesaid reception means 4.

Figure 2:
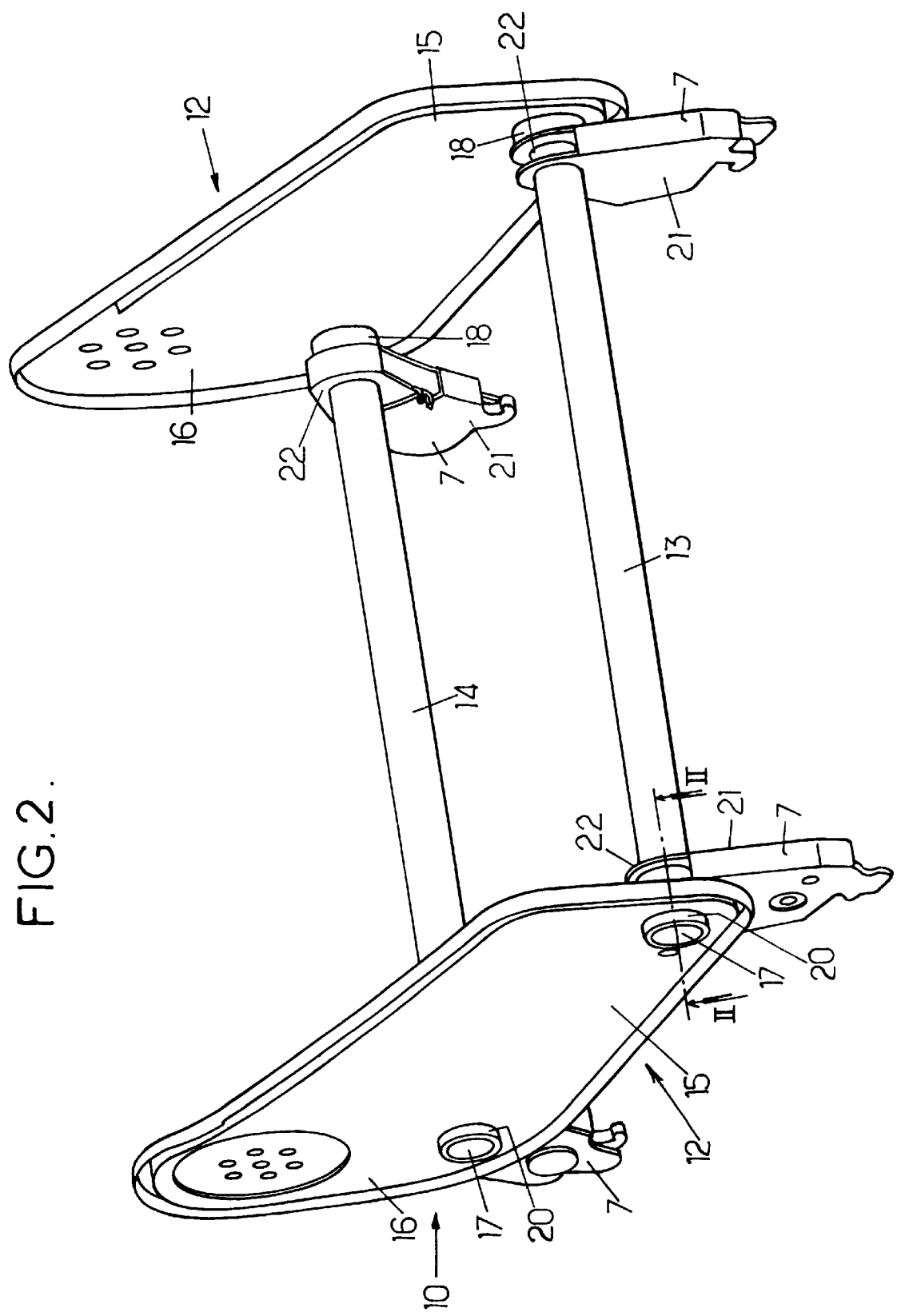
FIG. 2 is a perspective view of a first embodiment of the seat cushion structure of the seat according to the present invention.
Figure 4:
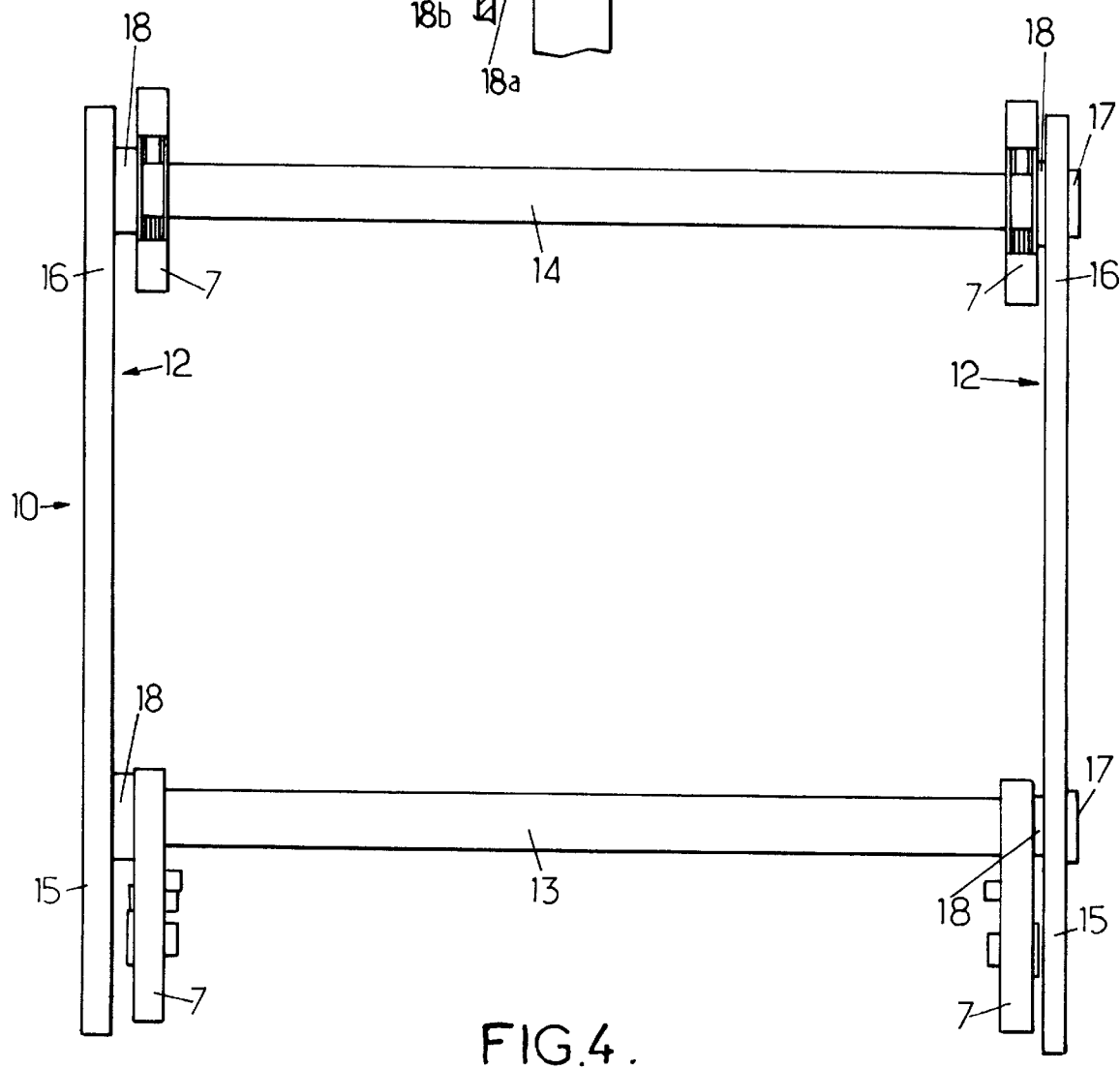
FIG. 4 is a plan view of the seat cushion structure shown in FIG. 2.

The seat cushion 5 consists of a seat cushion structure 10 shown in FIGS. 2 and 4 on which is added a seat upholstery (not shown).

The seat cushion structure includes two lateral flanges 12 which extend parallel to the vehicle longitudinal direction and which are connected by two transverse tubes 13 and 14.

Each lateral flange 12 consists of a stamped metal sheet which includes a front part 15 and a rear part 16, the rear part 16 being intended to support the seat back 6.

The tube 13 or front tube connects the front part 15 of the two lateral flanges 12 whilst the tube 14 or rear tube connects the two rear parts 16 of the two lateral flanges 12.

Each of the two transverse tubes 13 and 14 has two free ends 17 which are rotatively mounted in the two flanges 12.

For this purpose, two holes 19 (FIG. 3) are made in each of the two flanges 12, in their front 15 and rear 16 parts. The perimeters of the four holes 19 are folded outward from the seat cushion structure 10 so as to form bearing surfaces 20.

Four cylindrical struts or spacers 18 are rotation mounted in the holes 19. Each of these struts consists of two sections 18a and 18b of diameters successively decreasing from the inside to the outside of the seat cushion structure 10. The diameter of the external section 18b is adapted so that this section can rotate on the bearing surface 20, whilst the section 18a is abutted against the inside of the flange 12.

Each end 17 of the front 13 and rear 14 tubes is fitted in one of the four struts 18 and crimped open over this strut so that each of the two front 13 and rear 14 tubes is fixed in two struts 18 and rotary in the flanges 12. These struts thus function as collars.

In order to be positioned in the vehicle, the seat cushion structure 10 additionally includes four feet 7 intended to engage with the reception means 4 of the floor 3.

Each foot 7 consists of a main part 21 surmounted by a part forming a collar 22. Two feet 7 are added on each of the two tubes 13 and 14 by stringing or slipping the parts forming the collar 22 over the free ends 17 of these tubes. The parts 22 of the feet 7 are abutted against the sections of largest diameter 18a of the struts 18 and are welded on the tubes 13 and 14.

The manufacture of this seat cushion structure 10 is described with reference to FIGS. 3 and 4.

Firstly, the feet 7 are mounted to move freely along the length of each tube 13 and 14 by slipping them on by their collar 22. The assembly is then placed in a template (not shown) in order to install each of the feet 7 in their marked out spot. These positions correspond to a precise spacing of the feet 7 adapted to the location of the reception means 4 of the vehicle floor 3 onboard which the seat 1 is intended to be placed.

The feet 7 are then fixed on the tubes 13 and 14 by welding their collar 22.

Secondly, the struts 18 are fitted on the front 13 and rear 14 tubes, by the free ends 17 of these tubes. The largest diameter sections 18a of these struts are abutted against the collars 22 of the feet 7.

The manufacturing process consists in fitting the struts 18 by their smallest diameter sections 18b in each of the bearing surfaces 20 of the two lateral flanges 12. The ends 17 of the tubes have then only to be crimped open over the struts 18. The two flanges are in this way laterally restrained.

The length of the sections 18b is greater than that of the bearing surfaces 20 so as to define a small play between the ends of these bearing surfaces and the crimped ends 17. Rotation of the tubes 13 and 14 in the flanges 12 is thus ensured.

It is understood therefore that it is very easy, during mounting, to modify the interval between the seat feet 7 while leaving the width of the structure unaltered, by varying only the length of the struts 18. The other constituent parts of the seat cushion structure 10 therefore remain unaltered, which eliminates the necessity of modifying the tooling during mounting.

Figure 3:
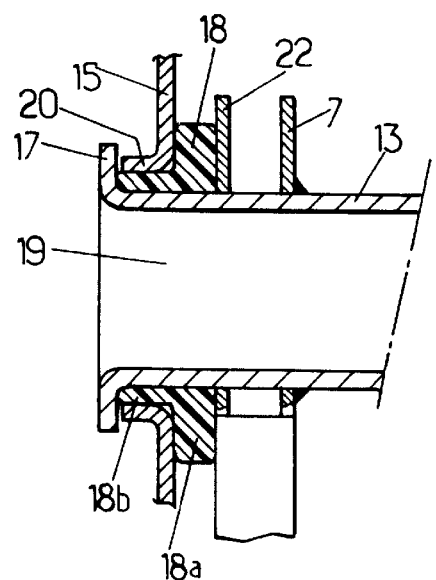
FIG. 3 is a part section view along the line II—II of FIG. 2.
Figure 5:
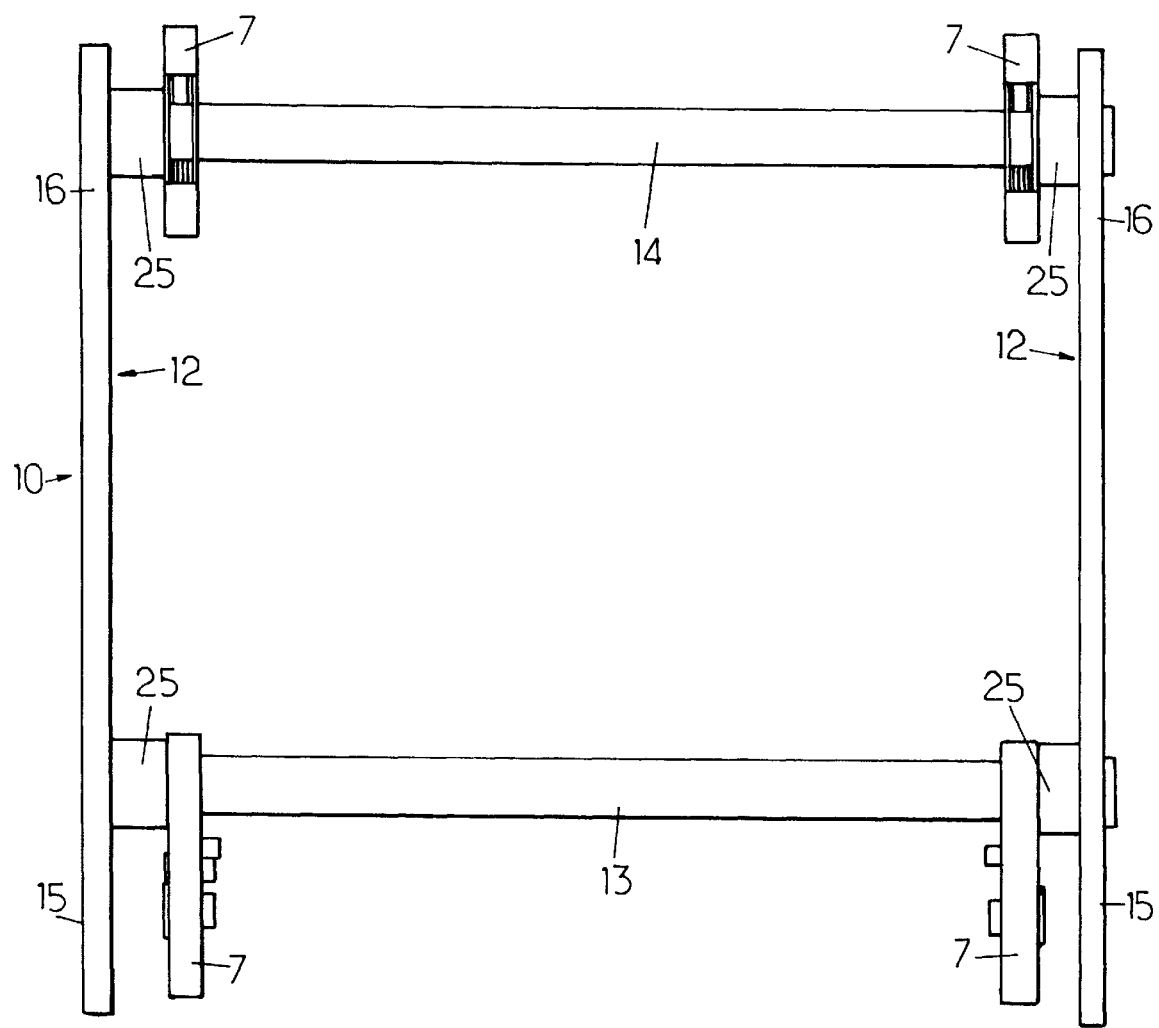
FIG. 5 is a plan view of a second embodiment of the seat structure of the seat according to the present invention.

This is illustrated by the second embodiment shown in FIG. 5 in which the seat cushion structure 10 differs from that shown in FIGS. 2 and 3 only by the length of the struts 25. The identical components in the two embodiments carry the same references.

The seat cushion structure 10 again comprises two lateral flanges 12 held separated by two transverse tubes 13 and 14 which each carry two feet 7. The interval between the feet 7 is now smaller than in the first embodiment whereas the two lateral flanges 12 are spaced by the same width.

For this purpose, the feet 7 have been welded on the tubes 13 and 14 after having been placed in the template and the struts 25, of a greater length than the lengths of the struts 18 described with reference to the first embodiment, have been abutted against the feet 7. The variation of strut length corresponds approximately to the variation of the interval between the feet.

This length variation of the interval enables the adaptation of the seat 2 on a floor 3 the reception means 4 of which are spaced by a pre-specified value less than that of the value corresponding to the seat of the first embodiment. This adaptation is obtained without modifying the general structure of the seat 5 and in particular without modifying the spacing or the form of the lateral flanges 12.

What is claimed is:

1. A seat for an automobile vehicle including a seat cushion which supports a seat back and which is intended to be fixed on the floor of the vehicle by means of feet, the seat cushion comprising a seat cushion structure which includes at least two lateral flanges intended to support the back and at least two tubes transversely connecting the two flanges, at least two feet being rigidly fixed on each of the tubes, each foot being spaced from the corresponding flange by a strut which surrounds the corresponding tube and which abuts both said foot and said corresponding flange.

2. A seat for an automobile vehicle according to claim 1, the vehicle floor comprising reception means for the feet which are spaced by a pre-specified value, in which the length of each strut is adapted to obtain an interval, between two feet carried by the same tube, of length approximately equal to aforesaid pre-specified value.

3. A seat for an automobile vehicle according to claim 1, in which the two flanges each include a front part and a rear part, the two front parts and the two rear parts being respectively connected by the two transverse tubes.

4. A seat for an automobile vehicle according to claim 1, in which the tubes and the feet are metallic parts, the feet being fixed on the tubes by welding.

5. A seat for an automobile vehicle according to claim 1, in which the struts are rotatively mounted in the two lateral flanges.

6. A seat for an automobile vehicle according to claim 1, in which each flange includes an inside which is directed towards the feet and an outside which is directed opposite to the feet, and the transverse tubes each include two free ends which are crimped open in the struts on the outside of the corresponding flange.

7. A seat for an automobile vehicle according to claim 1, in which the seat is removable from the floor.

8. A seat for an automobile vehicle according to claim 1, in which the tubes are rectilinear at least near the lateral flanges.

9. A manufacturing process of a seat according to claim 1 including stages consisting in:

slipping two feet onto each of the two tubes;

adjusting the struts of the feet on each tube and welding the feet on these tubes;

fitting the struts on the tubes and abutting the struts against the feet;

positioning the struts in the flanges; and crimping open the ends of the tubes over the struts.

* * * * *

UNITED STATES PATENT AND TRADEMARK OFFICE
CERTIFICATE OF CORRECTION

PATENT NO. : 6,227,595 B1
DATED : May 8, 2001
INVENTOR(S) : Hamelin et al.

It is certified that error appears in the above-identified patent and that said Letters Patent is hereby corrected as shown below:

<u>Assignee,</u>
"Bertgrand" should be -- Bertrand --.

Signed and Sealed this

Thirteenth Day of November, 2001

Attest:

NICHOLAS P. GODICI
Attesting Officer    Acting Director of the United States Patent and Trademark Office